US011996637B2

(12) United States Patent
Wang et al.

(10) Patent No.: US 11,996,637 B2
(45) Date of Patent: May 28, 2024

(54) ANTENNA UNIT, PREPARATION METHOD THEREOF, AND ELECTRONIC DEVICE

(71) Applicants: Beijing BOE Technology Development Co., Ltd., Beijing (CN); BOE Technology Group Co., Ltd., Beijing (CN)

(72) Inventors: Yali Wang, Beijing (CN); Dongdong Zhang, Beijing (CN); Feng Qu, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 208 days.

(21) Appl. No.: 17/503,387

(22) Filed: Oct. 18, 2021

(65) Prior Publication Data

US 2022/0311141 A1 Sep. 29, 2022

(30) Foreign Application Priority Data

Mar. 23, 2021 (CN) ......................... 202110310376.2

(51) Int. Cl.
*H01Q 9/04* (2006.01)
*H01Q 5/50* (2015.01)

(52) U.S. Cl.
CPC ............. *H01Q 9/0457* (2013.01); *H01Q 5/50* (2015.01)

(58) Field of Classification Search
CPC ......... H01Q 9/045; H01Q 9/0457; H01Q 5/50
See application file for complete search history.

(56) References Cited

U.S. PATENT DOCUMENTS

2017/0288313 A1 10/2017 Chung et al.
2018/0026374 A1* 1/2018 Chen ...................... H01Q 9/065 343/810
2018/0294562 A1 10/2018 Lu et al.
2019/0341693 A1* 11/2019 Haziza .................... H01P 11/00
(Continued)

FOREIGN PATENT DOCUMENTS

CN 104577316 A 4/2015
CN 206602182 U 10/2017
(Continued)

OTHER PUBLICATIONS

Office Action dated Aug. 29, 2023 for Chinese Patent Application No. 2021103103762 and English Translation.

*Primary Examiner* — Daniel Munoz
(74) *Attorney, Agent, or Firm* — Ling Wu; Stephen Yang; Ling and Yang Intellectual Property

(57) ABSTRACT

Provided is an antenna unit, including a first substrate and a second substrate that are oppositely disposed, a liquid crystal layer located between the first substrate and the second substrate, and a third substrate located on a side of the second substrate away from the liquid crystal layer. The first substrate includes a first base substrate and a radiation unit layer. The second substrate includes a second base substrate and a ground layer. The radiation unit layer and the ground layer face the liquid crystal layer. The third substrate includes a third base substrate and a feed structure layer, wherein the feed structure layer is located on a side of the third base substrate away from the second substrate.

18 Claims, 7 Drawing Sheets

(56) References Cited

U.S. PATENT DOCUMENTS

| | | | | |
|---|---|---|---|---|
| 2020/0243969 | A1* | 7/2020 | Fang | H01Q 3/36 |
| 2020/0313282 | A1 | 10/2020 | Jia | |
| 2020/0313299 | A1 | 10/2020 | Jia | |
| 2021/0208430 | A1 | 7/2021 | Liu et al. | |
| 2021/0249789 | A1 | 8/2021 | Long et al. | |
| 2021/0359397 | A1 | 11/2021 | Qin et al. | |

FOREIGN PATENT DOCUMENTS

| | | | |
|---|---|---|---|
| CN | 107453035 | A | 12/2017 |
| CN | 108493592 | A | 9/2018 |
| CN | 109755737 | A | 5/2019 |
| CN | 109818150 | A | 5/2019 |
| CN | 110048224 | A | 7/2019 |
| CN | 110365422 | A | 10/2019 |
| CN | 110970722 | A | 4/2020 |
| CN | 111129749 | A | 5/2020 |
| CN | 210720940 | U | 6/2020 |
| CN | 111509403 | A | 8/2020 |
| CN | 111525264 | A | 8/2020 |
| CN | 111755805 | A | 10/2020 |
| CN | 111864341 | A | 10/2020 |
| CN | 112436275 | A | 3/2021 |

* cited by examiner

ANTENNA UNIT, PREPARATION METHOD THEREOF, AND ELECTRONIC DEVICE

CROSS-REFERENCE TO RELATED APPLICATION

The present application claims the priority to Chinese Patent Application No. 202110310376.2 filed to the CNIPA on Mar. 23, 2021, the content of which is incorporated herein by reference.

TECHNICAL FIELD

Embodiments of the present disclosure relate to, but are not limited to, the field of communication technologies, in particular to an antenna unit, a preparation method thereof, and an electronic device.

BACKGROUND

An antenna is an important part of mobile communication, and research and a design of the antenna play a vital role in mobile communication. The biggest change brought by the fifth generation mobile communication technology (5G) is innovation of user experience. Quality of signals in a terminal device directly affects the user experience. Therefore, a design of a 5G terminal antenna will surely become one of important links for 5G deployment. However, frequency spectrums of global 5G communication are not uniformly distributed, and a bandwidth of an antenna in related technologies is relatively narrow and is difficult to cover every frequency spectrum of 5G communication, thus bringing great challenges to the design of the antenna.

SUMMARY

The following is a summary of subject matters detailed herein. This summary is not intended to limit the protection scope of claims.

The embodiments of the present disclosure provide an antenna unit, a preparation method thereof, and an electronic device.

On one hand, an embodiment of the present disclosure provides an antenna unit, which includes a first substrate and a second substrate that are oppositely disposed, a liquid crystal layer between the first substrate and the second substrate, and a third substrate located on a side of the second substrate away from the liquid crystal layer. The first substrate includes a first base substrate and a radiation unit layer, wherein the radiation unit layer faces the liquid crystal layer. The second substrate includes a second base substrate and a ground layer, wherein the ground layer faces the liquid crystal layer. The third substrate includes a third base substrate and a feed structure layer, wherein the feed structure layer is located on a side of the third base substrate away from the second substrate.

In some exemplary embodiments, the first base substrate and the second base substrate are rigid base substrates and the third base substrate is a flexible substrate.

In some exemplary embodiments, the first base substrate and the second base substrate are glass base substrates.

In some exemplary embodiments, the ground layer has a slotted region; an overlap region of orthographic projections of the radiation unit layer and the feed structure layer on the second base substrate is overlapped with an orthographic projection of the slotted region on the second base substrate.

In some exemplary embodiments, the feed structure layer includes a microstrip line extending along a second direction. In a first direction, a distance between a center line of the microstrip line and a center line of the slotted region is less than or equal to 3 mm; the first direction crosses the second direction.

In some exemplary embodiments, the first substrate further includes a first conductive layer connected to the radiation unit layer, and the first conductive layer is located on a side of the radiation unit layer close to the first base substrate. The second substrate further includes a second conductive layer connected to the ground layer, wherein the second conductive layer is located on a side of the ground layer close to the second base substrate.

In some exemplary embodiments, the first conductive layer includes a first electrode; an orthographic projection of the second substrate on the first substrate is not overlapped with the first electrode; the second conductive layer includes a second electrode; an orthographic projection of the first substrate on the second substrate is not overlapped with the second electrode.

In some exemplary embodiments, materials of the first conductive layer and the second conductive layer are indium tin oxide, and materials of the radiation unit layer and the ground layer are metal materials.

In some exemplary embodiments, thicknesses of the radiation unit layer and the ground layer are greater than thicknesses of the first conductive layer and the second conductive layer.

In some exemplary embodiments, the ground layer includes a first connection region, and an orthographic projection of the first substrate on the second substrate is not overlapped with the first connection region; and an orthographic projection of the feed structure layer on the second substrate is overlapped with the first connection region.

On another hand, an embodiment of the present disclosure provides an electronic device including any antenna unit as described above.

On another hand, an embodiment of the present disclosure provides a preparation method of an antenna unit, which includes the following acts: preparing a first substrate and a second substrate, wherein the first substrate includes a first base substrate and a radiation unit layer, and the second substrate includes a second base substrate and a ground layer; aligning and cell-assembling the first substrate and the second substrate to form a liquid crystal cell, wherein the radiation unit layer faces the ground layer; preparing a third substrate, wherein the third substrate includes a third base substrate and a feed structure layer; attaching the third substrate to the liquid crystal cell, wherein the feed structure layer is located on a side of the third base substrate away from the second substrate.

In some exemplary embodiments, the preparation method further includes: after attaching the third substrate to the liquid crystal cell, pouring a liquid crystal material into a cavity of the liquid crystal cell to form a liquid crystal layer.

Other aspects will become apparent upon reading and understanding accompanying drawings and detailed description.

BRIEF DESCRIPTION OF DRAWINGS

Accompanying drawings are used to provide a further understanding of technical solutions of the present disclosure, constitute a part of the specification, used to explain the technical solutions of the present disclosure together with the embodiments of the present disclosure, and do not constitute any limitation on the technical solutions of the present disclosure. Shapes and sizes of one or more components in the accompanying drawings do not reflect real scales, and are only for a purpose of schematically illustrating contents of the present disclosure.

DETAILED DESCRIPTION

Figure 1:
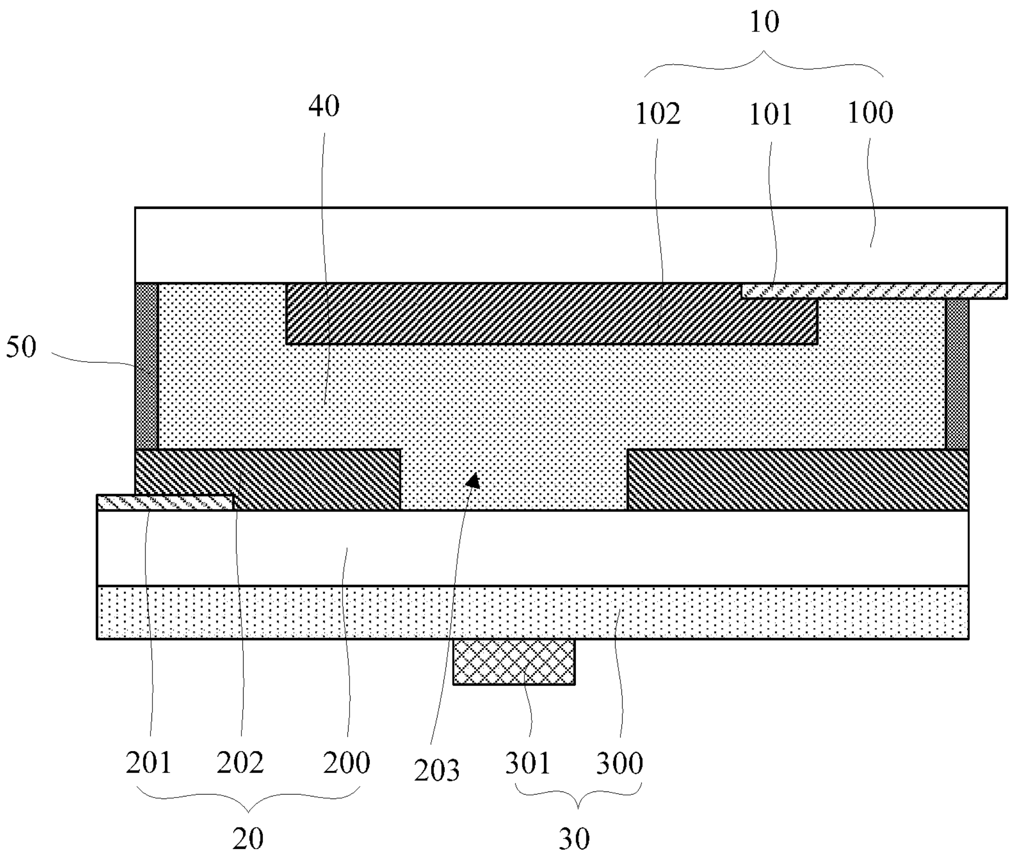
FIG. 1 is a schematic sectional view of an antenna unit according to at least one embodiment of the present disclosure.

The embodiments of the present disclosure are described below with reference to the accompanying drawings. The embodiments may be implemented in a plurality of different forms. Those of ordinary skills in the art will readily understand a fact that implementations and contents may be transformed into one or more of forms without departing from the spirit and scope of the present disclosure. Therefore, the present disclosure should not be construed as being limited only to what is described in the following embodiments. The embodiments and features in the embodiments in the present disclosure may be combined randomly if there is no conflict.

In the drawings, a size of one or more constituent elements, or a thickness or a region of a layer, is sometimes exaggerated for clarity. Therefore, a mode of the present disclosure is not necessarily limited to the size, and shapes and sizes of a plurality of components in the drawings do not reflect real scales. In addition, the drawings schematically show ideal examples, and a mode of the present disclosure is not limited to shapes or values shown in the drawings.

The "first", "second", "third" and other ordinal numbers in the present disclosure are set to avoid confusion of constituent elements, not to provide any quantitative limitation. The "plurality" in the present disclosure means two or more than two.

In the present disclosure, for the sake of convenience, wordings such as "central", "upper", "lower", "front", "rear", "vertical", "horizontal", "top", "bottom", "inner", "outer" and the others describing orientations or positional relations are used to depict positional relations of constituent elements with reference to the drawings, which are only for convenience of describing the specification and simplifying the description, rather than indicating or implying that an apparatus or element referred to must have a specific orientation, or must be constructed and operated in a particular orientation and therefore, those wordings cannot be construed as limitations on the present disclosure. The positional relations of the constituent elements may be appropriately changed according to a direction in which constituent elements are described. Therefore, it is not limited to the wordings described in the specification, and they may be replaced appropriately according to a situation.

In the present disclosure, the terms "installed", "connected", and "coupled" shall be understood in their broadest sense unless otherwise explicitly specified and defined. For example, a connection may be a fixed connection, or a detachable connection, or an integrated connection; it may be a mechanical connection, or an electrical connection; it may be a direct connection, or an indirect connection through middleware, or an internal connection between two elements. Those of ordinary skills in the art may understand meanings of the above terms in the present disclosure according to a situation.

In the present disclosure, "an electrical connection" includes a case where constituent elements are connected via an element having an electrical function. The "element having an electrical function" is not particularly limited as long as it may transmit and receive electrical signals between the connected constituent elements. Examples of the "element having an electrical function" not only include electrodes and wirings, but also include switching elements such as transistors, and include resistors, inductors, capacitors, other elements having one or more functions, and the like.

In the present disclosure, "parallel" refers to a state in which an angle formed by two straight lines is above −10 degrees and below 10 degrees, and thus may include a state in which the angle is above −5 degrees and below 5 degrees. In addition, "perpendicular" refers to a state in which an angle formed by two straight lines is above 80 degrees and below 100 degrees, and thus may include a state in which the angle is above 85 degrees and below 95 degrees.

"About" in the present disclosure means that limits of a value are not limited strictly, and the value is within a range of process and measurement errors.

At least one embodiment of the present disclosure provides an antenna unit, which includes a first substrate and a second substrate which are oppositely disposed, a liquid crystal layer located between the first substrate and the second substrate, and a third substrate located on a side of the second substrate away from the liquid crystal layer. The first substrate includes a first base substrate and a radiation unit layer. The radiation unit faces the liquid crystal layer. The second substrate includes a second base substrate and a ground layer. The ground layer faces the liquid crystal layer. The third substrate includes a third base substrate and a feed structure layer. The feed structure layer is located on a side of the third base substrate away from the second substrate. This embodiment provides an antenna unit with simple design, stable performance, and continuous reconfiguration of a resonant frequency.

In some exemplary embodiments, the first base substrate and the second base substrate are rigid base substrates, and the third base substrate is a flexible substrate. According to the antenna unit of this exemplary embodiment, a rigid base substrate is used to form a liquid crystal cell, which may accurately control a thickness of the liquid crystal cell and ensure uniformity of the thickness of the liquid crystal cell; a feed structure layer is formed on a flexible substrate, which may reduce microwave loss, thereby improving antenna performance.

In some exemplary embodiments, the first base substrate and the second base substrate are glass base substrates. However, this is not limited in the embodiment.

In some exemplary embodiments, the ground layer has a slotted region. An overlap region of orthographic projections of the radiation unit layer and the feed structure layer on the second base substrate, and an orthographic projection of the slotted region on the second base substrate, are overlapped. In this exemplary embodiment, coupling feeding between the radiation unit layer and the feed structure layer is achieved by forming a slotted region in the ground layer. In this embodiment, a feeding mode of aperture coupling is adopted, which may improve a gain and a radiation efficiency of an antenna.

In some exemplary embodiments, the feed structure layer includes: a microstrip line. The microstrip line extends along a second direction. In a first direction, a distance between a center line of the microstrip line and a center line of the slotted region of the ground layer of the second substrate is smaller than or equal to 3 mm. The first direction crosses the second direction, for example, the first direction is perpendicular to the second direction. In this exemplary embodiment, antenna performance may be ensured by controlling an error of a bonding process between the third substrate and the liquid crystal cell.

In some exemplary embodiments, the first substrate further includes a first conductive layer connected to the radiation unit layer, and the first conductive layer is located on a side of the radiation unit layer close to the first base substrate. The second substrate further includes a second conductive layer connected to the ground layer, and the second conductive layer is located on a side of the ground layer close to the second base substrate. An orthographic projection of the radiation unit layer on the first substrate is partially overlapped with an orthographic projection of the first conductive layer on the first base substrate. An orthographic projection of the ground layer on the second substrate is partially overlapped with an orthographic projection of the second conductive layer on the second base substrate. In this example, the first conductive layer and the second conductive layer are configured to transmit bias signals, such as DC bias signals or low-frequency square wave signals. However, this is not limited in the embodiment.

In some exemplary embodiments, thicknesses of the radiation unit layer and the ground layer are greater than thicknesses of the first conductive layer and the second conductive layer. However, this is not limited in the embodiment.

In some exemplary embodiments, the first conductive layer and the second conductive layer are made of Indium Tin Oxide (ITO), and the radiation unit layer and the ground layer are made of metal materials. However, this is not limited in the embodiment. In some examples, the radiation unit layer and the first conductive layer may be made of a same material, and the ground layer and the second conductive layer may be made of a same material.

In some exemplary embodiments, the first conductive layer includes a first electrode. An orthographic projection of the second substrate on the first substrate is not overlapped with the first electrode. The second conductive layer includes a second electrode. An orthographic projection of the first substrate on the second substrate is not overlapped with the second electrode. In some examples, the first substrate and the second substrate are misaligned in a first direction, exposing the first electrode and the second electrode. The first electrode and the second electrode may be configured to be connected to a bias voltage interface to apply a bias voltage signal. In this exemplary embodiment, by configuring the first substrate and the second substrate to be misaligned in the first direction to expose the first electrode and the second substrate, it is convenient to test antenna performance and avoid crosstalk between an RF signal and a bias voltage signal in an actual measurement process.

In some exemplary embodiments, the ground layer includes a first connection region. An orthographic projection of the first substrate on the second substrate is not overlapped with the first connection region; an orthographic projection of the feed structure layer on the second substrate is overlapped with the first connection region. In this example, by configuring the first substrate and the second substrate to be misaligned in a second direction, the first connection region of the ground layer is exposed, so that a radio frequency connector may be connected between the first connection region and the feed structure layer. However, this is not limited in the embodiment.

Solutions according to the embodiments will be illustrated by using some examples below.

Figure 2:
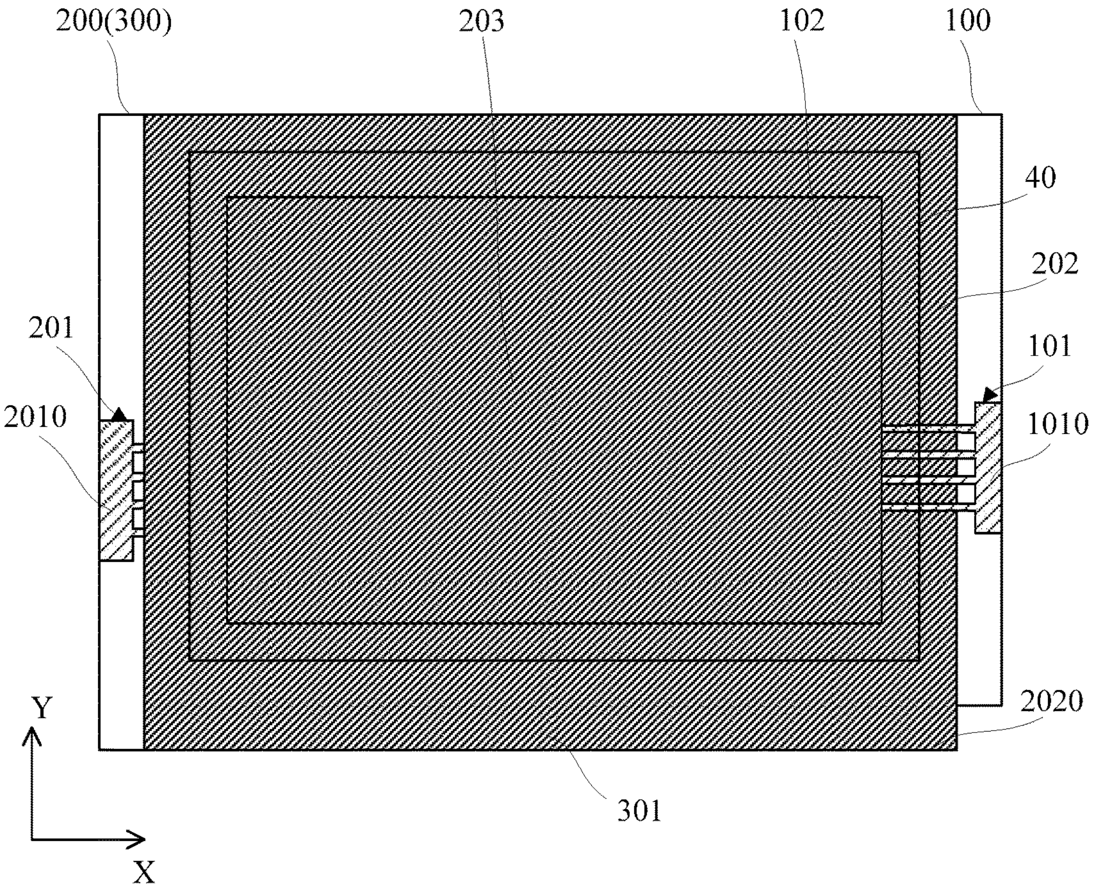
FIG. 2 is a schematic plan view of an antenna unit according to at least one embodiment of the present disclosure.
Figure 3:
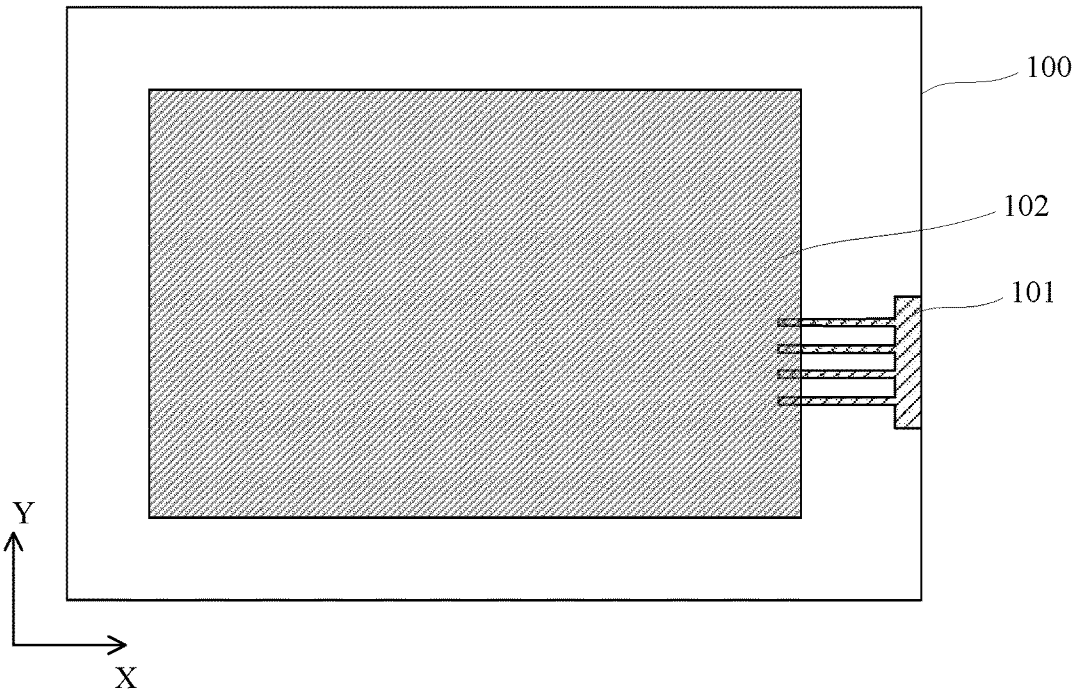
FIG. 3 is a schematic plan view of a first substrate of an antenna unit according to at least one embodiment of the present disclosure.
Figure 4:
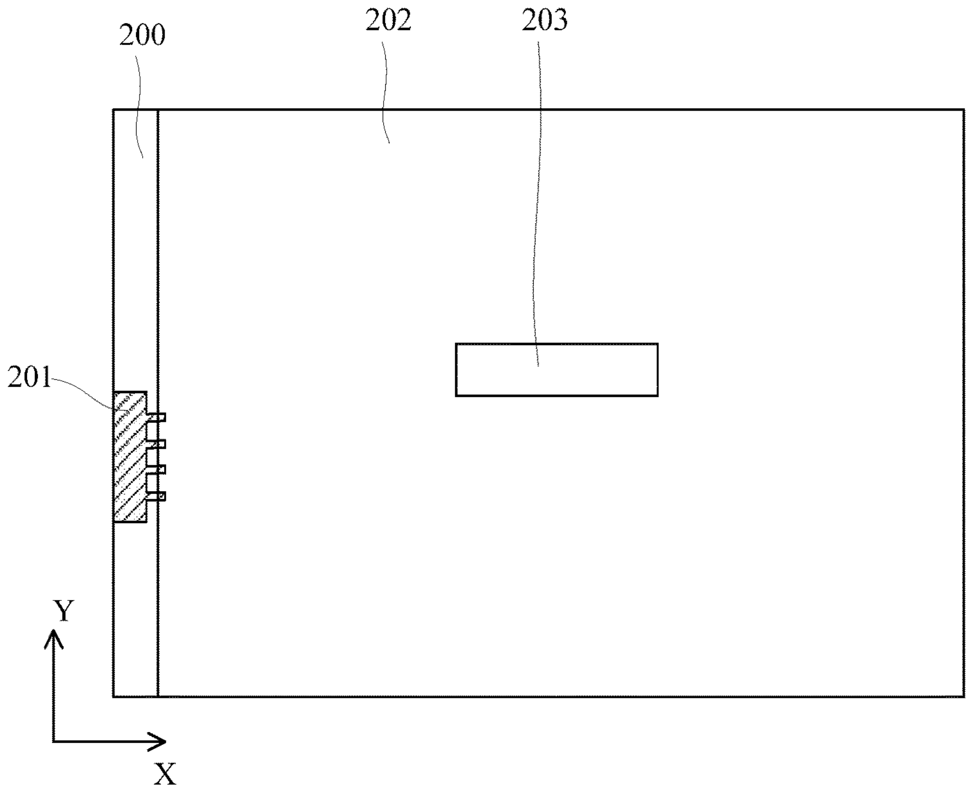
FIG. 4 is a schematic plan view of a second substrate of an antenna unit according to at least one embodiment of the present disclosure.
Figure 5:
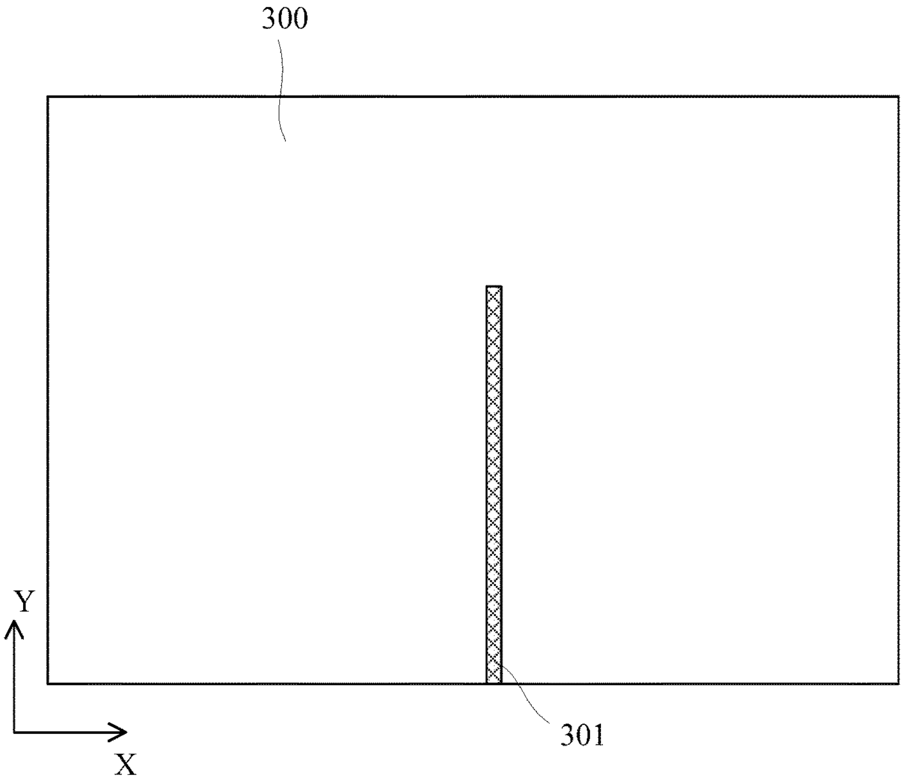
FIG. 5 is a schematic plan view of a third substrate of an antenna unit according to at least one embodiment of the present disclosure.

FIG. 1 is a schematic sectional view of an antenna unit according to at least one embodiment of the present disclosure. FIG. 2 is a schematic plan view of an antenna unit according to at least one embodiment of the present disclosure. FIG. 3 is a schematic plan view of a first substrate of an antenna unit according to at least one embodiment of the present disclosure. FIG. 4 is a schematic plan view of a second substrate of an antenna unit according to at least one embodiment of the present disclosure. FIG. 5 is a schematic plan view of a third substrate of an antenna unit according to at least one embodiment of the present disclosure. In some exemplary embodiments, as shown in FIG. 1 and FIG. 2, an antenna unit of this embodiment includes a first substrate 10 and a second substrate 20 disposed oppositely, a liquid crystal layer 40 located between the first substrate 10 and the second substrate 20, and a third substrate 30 located on a side of the second substrate 20 away from the liquid crystal layer 40. The first substrate 10 and the second substrate 20 are cell-assembled to form a liquid crystal cell. The third substrate 30 is attached to the liquid crystal cell and is adjacent to the second substrate 20.

In some exemplary embodiments, as shown in FIGS. 1 to 3, the first substrate 10 includes a first base substrate 100, a first conductive layer 101, and a radiation unit layer 102. The first conductive layer 101 is located on the first base substrate 100, and the radiation unit layer 102 is located on a side of the first conductive layer 101 away from the first base substrate 100. The first conductive layer 101 is located between the first base substrate 100 and the radiation unit layer 102. The radiation unit layer 102 faces the liquid crystal layer 40. The radiation unit layer 102 is in direct contact with the first conductive layer 101. An orthographic projection of the radiation unit layer 102 on the first base substrate 100 is overlapped with an orthographic projection of the first conductive layer 101 on the first base substrate 100. The radiation unit layer 102 and the first conductive layer 101 are electrically connected through an overlap region. In this embodiment, an overlap area of the radiation unit layer 102 and the first conductive layer 101 is not limited. In some examples, the radiation unit layer 102 may be rectangular, and the first conductive layer 101 is connected to the radiation unit layer 102 and located on a side of the radiation unit layer 102 in a first direction X. However, this is not limited in the embodiment.

In some exemplary embodiments, as shown in FIGS. 2 and 3, the first conductive layer 101 includes a first electrode

1010. An orthographic projection of the radiation unit layer 102 on the first base substrate 100 is not overlapped with an orthographic projection of the first electrode 1010 on the first base substrate 100. The first electrode 1010 may be in contact with the radiation unit layer 102 through a plurality of connecting portions (e.g., four strip-shaped connecting portions) to achieve electrical connection with the radiation unit layer 102. However, a quantity and sizes of the first electrodes are not limited in this embodiment.

In some exemplary embodiments, as shown in FIGS. 1 to 4, the second substrate 20 includes a second base substrate 200, a second conductive layer 201, and a ground layer 202. The second conductive layer 201 is located on the second base substrate 200, and the ground layer 202 is located on a side of the second conductive layer 201 away from the second base substrate 200. The second conductive layer 201 is located between the second base substrate 200 and the ground layer 202. The ground layer 202 faces the liquid crystal layer 40. The ground layer 202 is in direct contact with the second conductive layer 201. An orthographic projection of the ground layer 202 on the second base substrate 200 is overlapped with an orthographic projection of the second conductive layer 201 on the second base substrate 200. The ground layer 202 and the second conductive layer 201 are electrically connected through an overlap region. In this embodiment, an overlap area of the ground layer 202 and the second conductive layer 201 is not limited.

In some exemplary embodiments, as shown in FIG. 2 and FIG. 4, the ground layer 202 has a slotted region 203. An orthographic projection of the radiation unit layer 102 on the second base substrate 200 may cover an orthographic projection of the slotted region 203 on the second base substrate 200. In some examples, the slotted region 203 may be rectangular. The slotted region 203 may be located in a central region of the ground layer 202. However, this is not limited in the embodiment.

In some exemplary embodiments, as shown in FIGS. 2 and 4, the second conductive layer 201 includes a second electrode 2010. The second electrode 2010 is located on a side of the ground layer 202 in a first direction X. An orthographic projection of the ground layer 202 on the second base substrate 200 and an orthographic projection of the second electrode 2010 on the second base substrate 200 are not overlapped. The second electrode 2010 may be in contact with the ground layer 202 through a plurality of connecting portions (e.g., four strip-shaped connecting portions) to achieve electrical connection with the ground layer 202. However, this is not limited in the embodiment.

In some exemplary embodiments, as shown in FIGS. 2 to 4, in a first direction X, the first electrode 1010 and the second electrode 2010 are oppositely disposed. For example, the first electrode 1010 is located on a right side of the radiation unit layer 102, and the second electrode 2010 is located on a left side of the radiation unit layer 102. Orthographic projections of the first electrode 1010 and the second electrode 2010 on the second base substrate 200 are not overlapped. In this example, by configuring the first substrate 10 and the second substrate 20 to be misaligned along the first direction X, the first electrode 1010 and the second electrode 2010 are respectively exposed. However, this is not limited in the embodiment. For example, positions of the first electrode 1010 and the second electrode 2010 may be adjacent.

In some exemplary embodiments, as shown in FIGS. 1 to 4, the ground layer 202 includes a first connection region 2020. An orthographic projection of the first substrate 10 on the second substrate 20 is not overlapped with the first connection region 2020. An orthographic projection of the feed structure layer 301 on the second substrate 20 is overlapped with the first connection region 2020. In some examples, an RF connector may be welded between the first connection region 2020 and the feed structure layer 301, avoiding a complicated process of preparing a metallized via between the second base substrate 200 and a third base substrate 300.

In some exemplary embodiments, as shown in FIGS. 1 to 5, the third substrate 30 includes a third base substrate 300 and a feed structure layer 301. The feed structure layer 301 is located on the third base substrate 300. As shown in FIG. 1, the feed structure layer 301 is located on a side of the third base substrate 300 away from the second base substrate 200. An orthographic projection of the feed structure layer 301 on the second base substrate 200 is overlapped with an orthographic projection of the slotted region 203 of the ground layer 202 on the second base substrate 200. An orthographic projection of the feed structure layer 301 on the second base substrate 200 is overlapped with an orthographic projection of the radiation unit layer 102 on the second base substrate 200, and an overlap region is overlapped with an orthographic projection of the slotted region 203 on the second base substrate 200. The feed structure layer 301 may include a strip-shaped microstrip line extending along a second direction Y. The second direction Y and the first direction X are located in a same plane and perpendicular to each other. In this example, the microstrip line of the feed structure layer 301 may feed the radiation unit layer 102 through the slotted region 203 of the ground layer 202. A feeding mode of aperture coupling is adopted for the antenna unit of this exemplary embodiment, which may improve a gain and a radiation efficiency of an antenna.

In some exemplary embodiments, the first base substrate 100 and the second base substrate 200 may be rigid base substrates, such as glass substrates, and the third base substrate 300 may be a flexible base substrate. In this exemplary embodiment, by disposing a feed structure layer on a flexible base substrate, microwave loss may be reduced, thereby improving overall performance of an antenna. Using a rigid substrate to form a liquid crystal cell may accurately control a thickness of the liquid crystal cell and ensure that a thickness of the liquid crystal cell has good uniformity, thereby improving the overall performance of the antenna. In some examples, the first base substrate 100, the second base substrate 200, and the third base substrate 300 may all be rectangular. However, this is not limited in the embodiment.

In some exemplary embodiments, as shown in FIG. 1, a supporting structure 50 is further disposed between the first substrate 10 and the second substrate 20, and the supporting structure 50 includes, for example, a frame sealant and a spacer. A cavity may be formed between the first substrate 10 and the second substrate 20 through the supporting structure 50, and a liquid crystal layer 40 is formed between the first substrate 10 and the second substrate 20 by pouring a liquid crystal material into the cavity. However, this is not limited in the embodiment. In this exemplary embodiment, a gap between the first substrate 10 and the second substrate 20 may be maintained through the supporting structure 50, so as to prevent cavity collapse from affecting adversely uniformity of a thickness of the liquid crystal layer 40.

The following is an exemplary description through a preparation process of an antenna unit. A "patterning process" mentioned in the present disclosure includes processes, such as photoresist coating, mask exposure, development, etching, and photoresist stripping, for metal materials, inorganic materials, or transparent conductive materials, and includes organic material coating, mask exposure, and development for organic materials. Deposition may be any one or more of sputtering, evaporation, and chemical vapor deposition, coating may be any one or more of spray coating, spin coating, and inkjet printing, and etching may be any one or more of dry etching and wet etching, which are not limited in the present disclosure. A "Thin film" refers to a layer of thin film made of a material on a base substrate through deposition, coating, or other processes. If the patterning process is not needed for the "thin film" in a whole preparation process, the "thin film" may be called a "layer". If the patterning process is needed for the "thin film" in the whole making process, the thin film is called a "thin film" before the patterning process and called a "layer" after the patterning process. The "layer" after the patterning process includes at least one "pattern".

"A and B are disposed in a same layer" described in the present disclosure means that A and B are formed at the same time through a same patterning process. In an exemplary embodiment of the present disclosure, "an orthographic projection of A includes an orthographic projection of B" refers to that a boundary of the orthographic projection of B falls within a range of a boundary of the orthographic projection of A or a boundary of the orthographic projection of A is overlapped with a boundary of the orthographic projection of B.

In some exemplary embodiments, a preparation process of an antenna unit may include the following operations.

(1) A first substrate is prepared.

Figure 6A:
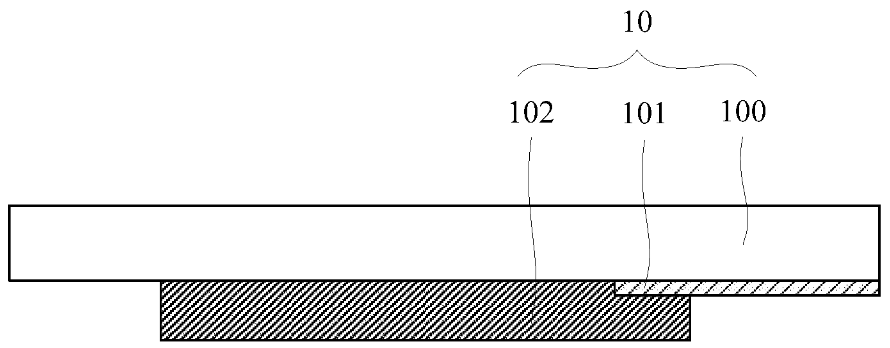
FIGS. 6A to 6E are schematic diagrams of a preparation process of an antenna unit according to at least one embodiment of the present disclosure.

In some exemplary embodiments, a first conductive layer 101 and a radiation unit layer 102 are sequentially formed on a first base substrate 100. In some examples, as shown in FIG. 6A, a first conductive thin film is deposited on the first base substrate 100, and the first conductive thin film is patterned through a patterning process to form a first conductive layer 101. Subsequently, a radiation unit layer 102 is formed by plating a film on the first base substrate 100. An orthographic projection of the radiation unit layer 102 on the first base substrate 100 is overlapped with an orthographic projection of the first conductive layer 101 on the first base substrate 100. In some examples, the first conductive layer 101 may be made of a transparent conductive material, such as indium tin oxide (ITO). The radiation unit layer 102 is rectangular, for example. The radiation unit layer 102 may be made of a metal material with good conductivity, such as copper (Cu). However, this is not limited in the embodiment.

(2) A second substrate is prepared.

Figure 6B:
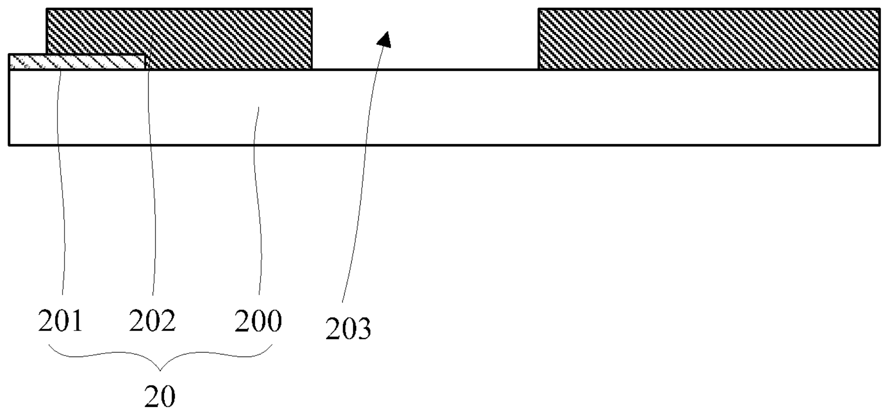

In some exemplary embodiments, a second conductive layer 201 and a ground layer 202 are sequentially formed on a second base substrate 200. In some examples, as shown in FIG. 6B, a second conductive thin film is deposited on the second base substrate 200, and the second conductive thin film is patterned through a patterning process to form a second conductive layer 201. Subsequently, a ground layer 202 is formed by plating a film on the second base substrate 200. An orthographic projection of the ground layer 202 on the second base substrate 200 is overlapped with an orthographic projection of the second conductive layer 201 on the second base substrate 200. The ground layer 202 has a slotted region 203. The slotted region 203 may be rectangular. In some examples, the second conductive layer 201 may be made of a transparent conductive material, such as ITO. The ground layer 202 may be made of a metal material with good conductivity, such as copper (Cu). However, this is not limited in the embodiment.

(3) The first substrate and the second substrate are aligned and cell-assembled to prepare a liquid crystal cell.

Figure 6C:
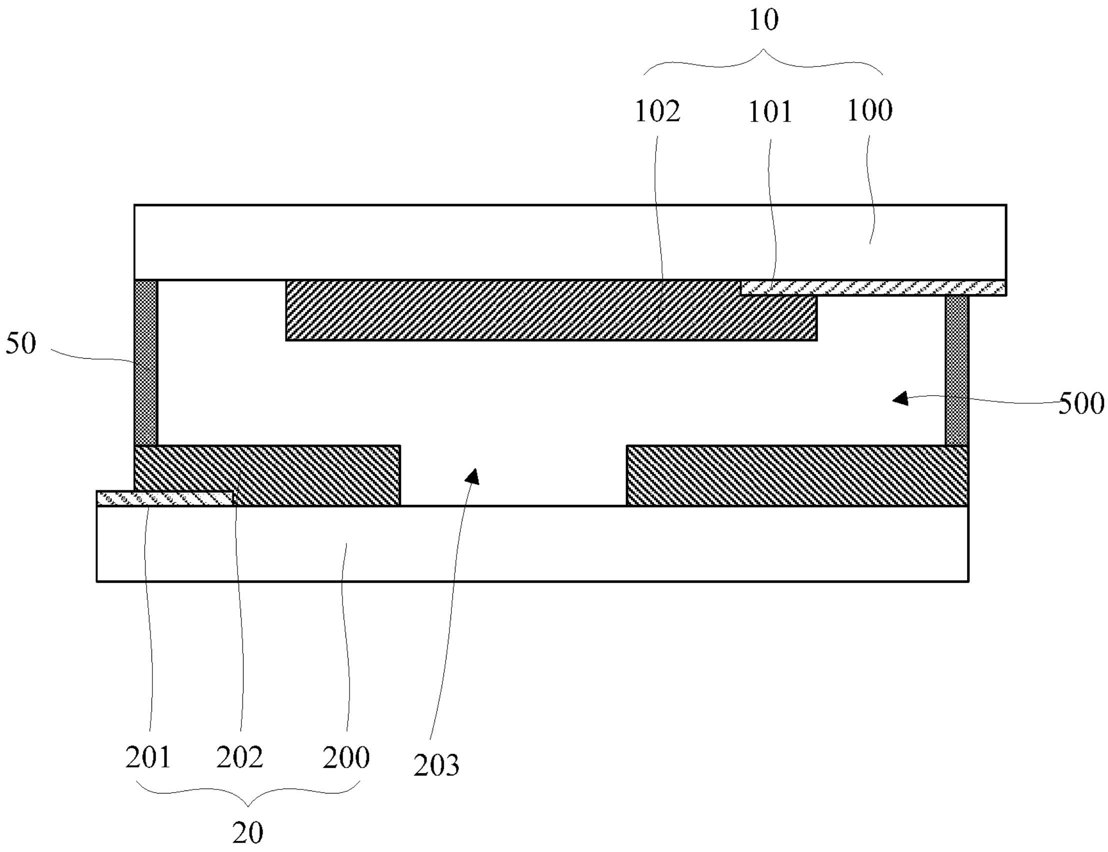

In some exemplary embodiments, a frame sealant is coated around the first substrate 10 or the second substrate 20, the first substrate 10 and the second substrate 20 are aligned and cell-assembled, and a supporting structure 50 is formed between the first substrate 10 and the second substrate 20 by curing the frame sealant. A cavity 500 is formed by the first substrate 10, the second substrate 20, and the supporting structure 50, as shown in FIG. 6C. The radiation unit layer 102 of the first substrate 10 faces the ground layer 202 of the second substrate 20. An orthographic projection of the radiation unit layer 102 on the second base substrate 200 is overlapped with an orthographic projection of the ground layer 202 on the second base substrate 200, and the orthographic projection of the radiation unit layer 102 on the second base substrate 200 covers an orthographic projection of the slotted region 203 of the ground layer 202 on the second base substrate 200.

In some exemplary embodiments, after the first substrate 10 and the second substrate 20 are cell-assembled, misaligned cutting is performed on the first substrate 10 and the second substrate 20 in a first direction X to expose a first electrode 1010 of the first conductive layer 101 of the first substrate 10 and a second electrode 2010 of the second conductive layer 201 of the second substrate 20. A bias voltage signal may be applied through the first electrode 1010 and the second electrode 2010. By disposing the first substrate 10 and the second substrate 20 to be misaligned on opposite sides of the first direction X, the first electrode 1010 and the second electrode 2010 are exposed respectively, so that bias voltage signals are applied on opposite sides of the first direction X, and crosstalk between radio frequency signals and bias voltage signals may be avoided.

In some exemplary embodiments, after the first substrate 10 and the second substrate 20 are cell-assembled, misaligned cutting is performed on the first substrate 10 in a second direction Y to expose a first connection region 2020 of the ground layer 202 of the second substrate 20. Through the exposed first connection region 2020, a radio frequency connector may be welded between the first connection region 2020 and a feed structure layer 301 to simplify the preparation process.

In this exemplary embodiment, the first substrate 10 and the second substrate 20 are misaligned on three sides.

(4) A third substrate is prepared.

Figure 6D:
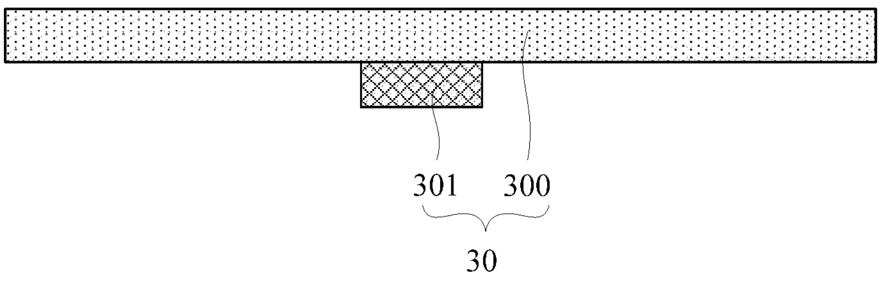

In some exemplary embodiments, the feed structure layer 301 is prepared on a third base substrate 300, as shown in FIG. 6D. In some examples, the third base substrate 300 may be made of a material such as Polyimide (PI). The feed structure layer 301 may be made of copper. However, this is not limited in the embodiment.

In some exemplary embodiments, a single-sided copper-clad substrate (including a third base substrate and a copper foil layer covering one surface of the third base substrate) is provided; a required pattern is etched in a single-sided copper foil layer through an exposure and development technology to form the feed structure layer 301.

(5) The third substrate is attached to the liquid crystal cell.

Figure 6E:
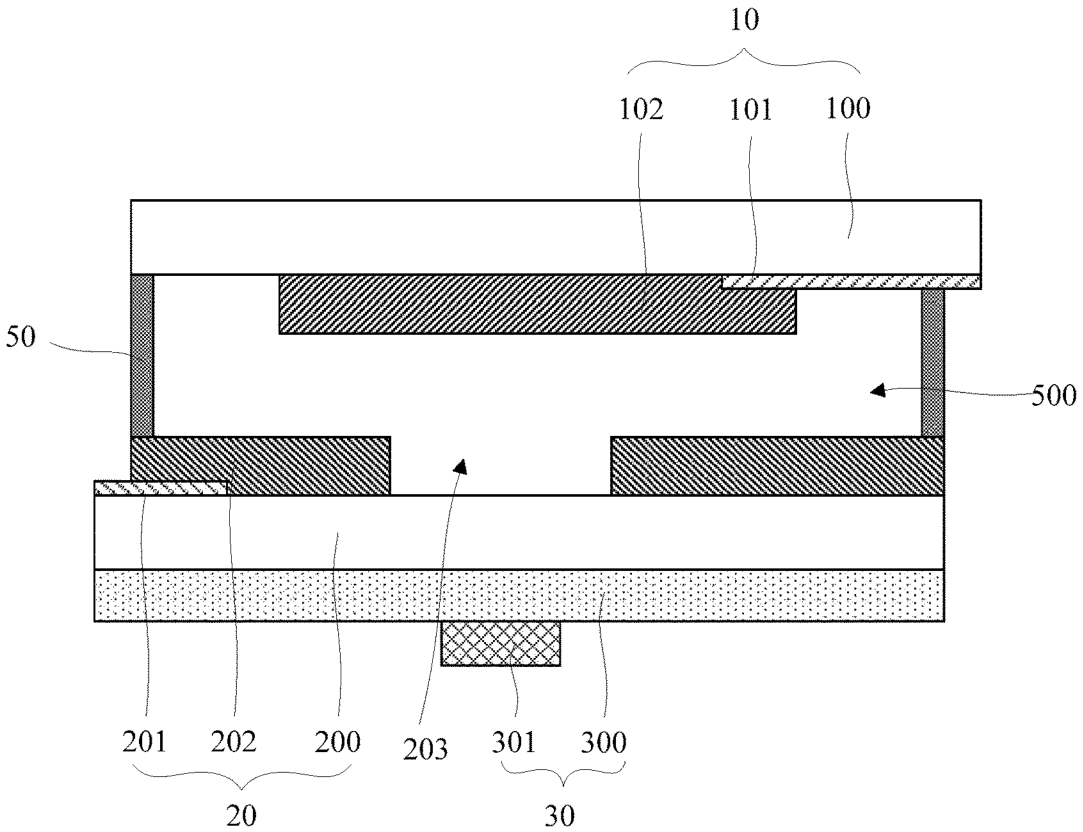

In some exemplary embodiments, a surface of the third base substrate 300 away from the feed structure layer 301 is attached to the second base substrate 200 of the liquid crystal cell. As shown in FIG. 6E, the third base substrate 300 is directly attached to the second base substrate 200. The feed structure layer 301 is located on a side of the third base substrate 300 away from the second base substrate 200.

Figure 7:
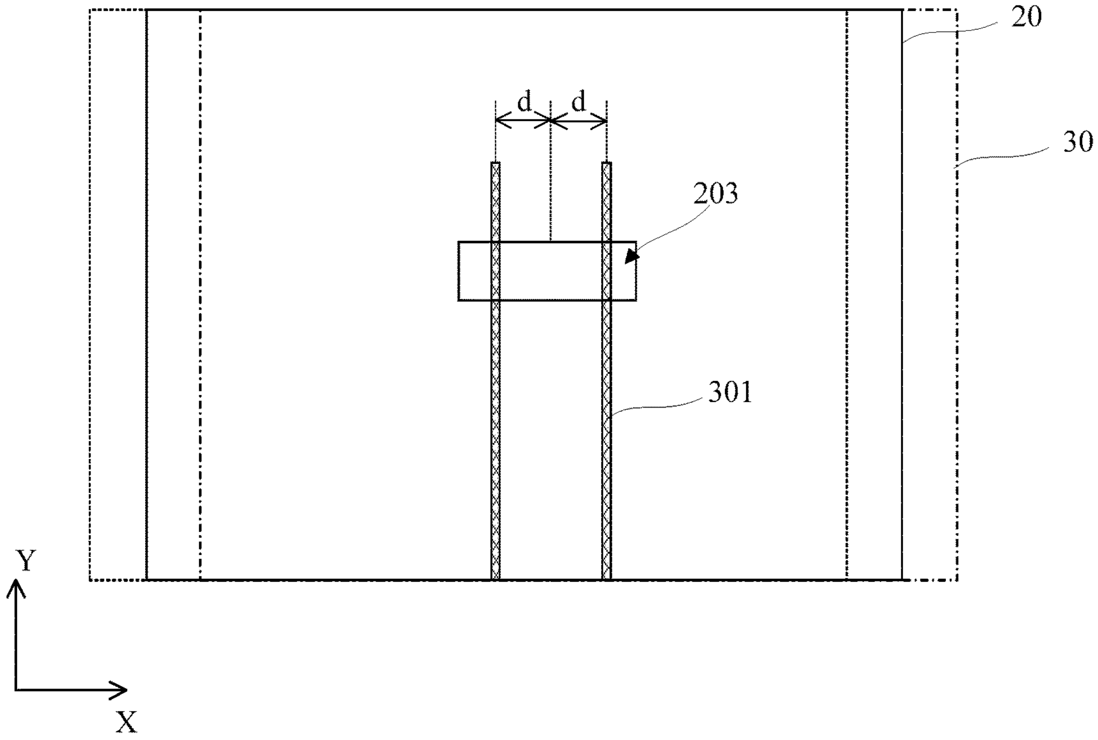
FIG. 7 is a schematic diagram of a bonding deviation between a second substrate and a third substrate according to at least one embodiment of the present disclosure.

FIG. 7 is a schematic diagram of a bonding deviation between the third substrate 30 and the second substrate 20 according to at least one embodiment of the present disclosure. As shown in FIG. 7, in a process of attaching the third substrate 30 to the second substrate 20 of the liquid crystal cell, in the first direction X, a distance d between a center line of a microstrip line of the feed structure layer 301 and a center line of the slotted region 203 of the ground layer of the second substrate 20 may be less than or equal to 3 millimeters (mm) to avoid affecting antenna performance adversely. In this example, sizes of the third substrate 30 and the second substrate 20 along the second direction Y may be the same.

(6) The liquid crystal cell is filled with crystal.

In some exemplary embodiments, a plurality of crystal filling ports may be disposed on the supporting structure 50 sequentially, and a liquid crystal material may be filled into the cavity 500 through the crystal filling ports to form a liquid crystal layer 40 between the first substrate 10 and the second substrate 20, as shown in FIG. 2. In some examples, the liquid crystal material may be microwave liquid crystal with a higher tuning capability. However, this is not limited in the embodiment.

In this exemplary embodiment, the radiation unit layer 102 and the ground layer 202 constitute upper and lower electrodes for controlling operation of the liquid crystal layer 40. Using dielectric properties of a liquid crystal material itself, it is easy to achieve continuous tuning capability of a resonant frequency of an antenna, and a tuning range is proportional to a tuning ratio of the liquid crystal material. When the resonant frequency of the antenna needs to be adjusted, a bias voltage signal may be applied through the first electrode 2010 and the second electrode 2020, so that a voltage difference is generated between the radiation unit layer 102 and the ground layer 202, and an arrangement mode of liquid crystal molecules is changed, thereby achieving an effect of adjusting the resonant frequency of the antenna. The antenna unit of this embodiment may integrate functions of an antenna tuner and an antenna switch, which greatly reduces difficulties and costs of a design of an antenna.

Descriptions of the structure and the preparation process of the antenna unit according to an exemplary embodiment of the present disclosure are merely illustrative. In some exemplary embodiments, according to actual needs, a corresponding structure may be changed and patterning processes may be added or reduced. For example, after the first substrate and the second substrate are aligned and cell-assembled to form the liquid crystal cell, the liquid crystal cell is filled with crystal, and then the third substrate is attached to the liquid crystal cell. However, this is not limited in the embodiment.

In this exemplary embodiment, a thickness of the liquid crystal cell may be accurately controlled by using a display preparation process to prepare the liquid crystal cell, so that the thickness of the liquid crystal cell has good uniformity; by using a flexible circuit board preparation process to prepare the third substrate, microwave loss may be reduced, thus improving overall performance of the antenna unit. In addition, a feeding mode of aperture coupling is adopted for the antenna unit of this exemplary embodiment, which may improve a gain and a radiation efficiency of an antenna.

The preparation process according to the exemplary embodiment may be achieved by using an existing mature preparation device, has little improvement on an existing process, may be well compatible with an existing preparation process, and has advantages of simple process realization, easy implementation, higher production efficiency, lower production cost, and higher yield.

The performance of the antenna unit of this embodiment according to this embodiment will be illustrated below through a plurality of examples. In the following examples, a plane size is a second length * a first length, where the second length is a length along a second direction Y and the first length is a length along a first direction X. The first direction X is perpendicular to the second direction Y. In the present disclosure, a "thickness" may be a vertical distance between a surface of a film layer on a side away from a base substrate and a surface of the film layer on a side close to the base substrate.

In a first example, a first base substrate and a second base substrate may be glass substrates with a thickness of about 0.15 millimeters (mm). A plane size of the first substrate is about 29 mm*42 mm, and a plane size of the second substrate is 32.5 mm*42 mm. A material of the third substrate may be made of polyimide (PI) material with a thickness about 25 microns (um), and a plane size of the third substrate is about 32.5 mm*42 mm. The plane size of the second substrate is the same as that of the third substrate and is larger than that of the first substrate. In this example, a dielectric constant dk/a dielectric loss df of glass is about 5.2/0.01, and dk/df of PI material is about 3.38/0.015. A radiation unit layer and a ground layer may be made of copper with a thickness about 2 microns. A feed structure layer may be made of copper with a thickness about 18 microns. A plane size of the radiation unit layer may be about 21 mm*32 mm; a plane size of the ground layer may be about 32.5 mm*40 mm, and a plane size of a slotted region of the ground layer is about 3 mm*10 mm; a plane size of a feed structure layer may be about 22 mm*0.3 mm. A plane size of a liquid crystal layer is about 25 mm*36 mm and a thickness of the liquid crystal layer is about 200 microns. Thicknesses of a first conductive layer and a second conductive layer is about 700 angstroms, and the first conductive layer and the second conductive layer may be made of ITO with a square resistance about 50 Ω/sq to 60 Ω/sq. An overall size of an antenna in this example is $\lambda 0*(0.38*0.51*0.006)$, wherein $\lambda 0$ is a vacuum wavelength corresponding to a working frequency point of 3.5 GHz. The dk/df of a liquid crystal material in a vertical state is about 2.36/0.01, the dk/df of the liquid crystal material in a flat state is about 3.02/0.004, and the dk/df of the liquid crystal material in a mixed state is about 2.7/0.008.

In the first example, since the first conductive layer and the second conductive layer are thin and small in area, an influence on a simulation result may be ignored. Simulation results of an antenna unit of the first example are as follows: a resonant frequency $f0$ of a liquid crystal layer in a vertical state is 3.735 GHz, a corresponding gain G at $f0$ is 0.6 dBi, and a corresponding radiation efficiency at $f0$ is −6 dB; a resonant frequency $f0$ of the liquid crystal layer in a flat state is 3.34 GHz, a corresponding gain G at $f0$ is 1.3 dBi, and a corresponding radiation efficiency at $f0$ is −5 dB; and a resonance frequency $f0$ of the liquid crystal layer in a mixed state is 3.55 GHz, a corresponding gain G at $f0$ is 0.8 dBi, and a corresponding radiation efficiency at $f0$ is −4.7 dB. A frequency modulation range of the antenna unit of the first example is about 395 MHz, which may basically cover 5G n78 frequency band, and antenna performance may meet requirements of a mobile phone for the antenna.

In a second example, a thickness of a liquid crystal layer is about 100 um, a plane size of a feed structure layer is about 24 mm*0.3 mm, and a size of an antenna is $\lambda 0*(0.38*0.51*0.005)$, wherein $\lambda 0$ is a vacuum wavelength corresponding to a working frequency point of 3.5 GHz. Remaining parameters of the second example are the same as those of the first example. Simulation results of an antenna unit of the second example are as follows: a resonant frequency f0 of the liquid crystal layer in a vertical state is 3.755 GHz, a corresponding gain G at f0 is −2.93 dBi, and a corresponding radiation efficiency at f0 is −9.5 dB; a resonant frequency f0 of the liquid crystal layer in a flat state is 3.345 GHz, a corresponding gain G at f0 is −2.93 dBi, and a corresponding radiation efficiency at f0 is −9 dB; and a resonance frequency f0 of the liquid crystal layer in a mixed state is 3.54 GHz, a corresponding gain G at f0 is −2.82 dBi, and a corresponding radiation efficiency at f0 is −9.3 dB. A frequency modulation range of the antenna unit of the second example is about 410 MHz, which may basically cover 5G n78 frequency band, but antenna performance cannot meet requirements of a mobile phone for the antenna. According to the first example and the second example, it may be seen that a thickness of a liquid crystal layer significantly affects antenna performance adversely. In this exemplary embodiment, a liquid crystal cell is cell-assembled by using a rigid base substrate, which may accurately control uniformity of a thickness of the liquid crystal cell, thereby improving antenna performance.

In a third example, thicknesses of a radiation unit layer and a ground layer are about 18 microns, and remaining parameters are the same as those of the first example. Simulation results of an antenna unit of the third example are as follows: a resonant frequency f0 of a liquid crystal layer in a vertical state is 3.745 GHz, a corresponding gain G at f0 is 0.39 dBi, and a corresponding radiation efficiency at f0 is −6.25 dB; a resonant frequency f0 of the liquid crystal layer in a flat state is 3.34 GHz, a corresponding gain G at f0 is 1.3 dBi, and a corresponding radiation efficiency at f0 is −5 dB; and a resonance frequency f0 of the liquid crystal layer in a mixed state is 3.54 GHz, a corresponding gain G at f0 is 0.66 dBi, and a corresponding radiation efficiency at f0 is −5.7 dB. A frequency modulation range of the antenna unit of the third example is about 405 MHz, which may basically cover 5G n78 frequency band, and antenna performance may meet requirements of a mobile phone for an antenna. Compared with the first example, increasing the thicknesses of the radiation unit layer and the ground layer does not significantly improve the antenna performance.

In a fourth example, the dk/df of PI material is about 3.1/0.006, a plane size of a feed structure layer is about 24 mm*0.3 mm, and remaining parameters are the same as those of the first example. Simulation results of an antenna unit of the fourth example are as follows: a resonant frequency f0 of a liquid crystal layer in a vertical state is 3.74 GHz, a corresponding gain G at f0 is 0.72 dBi, and a corresponding radiation efficiency at f0 is −6 dB; a resonant frequency f0 of the liquid crystal layer in a flat state is 3.325 GHz, a corresponding gain G at f0 is 1.1 dBi, and a corresponding radiation efficiency at f0 is −5.1 dB; and a resonance frequency f0 of the liquid crystal layer in a mixed state is 3.545 GHz, a corresponding gain G at f0 is 0.88 dBi, and a corresponding radiation efficiency at f0 is −5.5 dB. A frequency modulation range of the antenna unit of the fourth example is about 415 MHz, which may basically cover 5G n78 frequency band, and antenna performance may meet requirements of a mobile phone for an antenna. Compared with the first example, using PI material with low dielectric loss does not significantly improve the antenna performance.

In the fifth example, dk/df of a liquid crystal material in a vertical state is about 2.45/0.01, dk/df of the liquid crystal material in a flat state is about 3.58/0.0086, and dk/df of the liquid crystal material in a mixed state is about 3.02/0.009. A plane size of a radiation unit layer is about 19.5 mm*32 mm, and remaining parameters are the same as those of the first example. Simulation result of an antenna unit of the fourth example are as follows: a resonant frequency f0 of a liquid crystal layer in a vertical state is 3.85 GHz, a corresponding gain G at f0 is 1.4 dBi, and a corresponding radiation efficiency at f0 is −5.5 dB; a resonant frequency f0 of the liquid crystal layer in a flat state is 3.27 GHz, a corresponding gain G at f0 is 0.21 dBi, and a corresponding radiation efficiency at f0 is −5.75 dB; and a resonance frequency f0 of the liquid crystal layer in a mixed state is 3.55 GHz, a corresponding gain G at f0 is 0.84 dBi, and a corresponding radiation efficiency at f0 is −5.5 dB. A frequency modulation range of the antenna unit of the fifth example is about 580 MHz, which may fully cover 5G n78 frequency band, and antenna performance may meet requirements of a mobile phone for an antenna. Compared with the first example, the fifth example may obviously improve a frequency tuning range of the antenna by increasing a tuning ratio of the liquid crystal material, but has no obvious influence on a gain and a radiation efficiency of the antenna.

In a sixth example, dk/df of glass is about 4.3/0.002, and remaining parameters are the same as those of the first example. Simulation results of an antenna unit of the sixth example are as follows: a resonant frequency f0 of a liquid crystal layer in a vertical state is 3.72 GHz, a corresponding gain G at f0 is 1.4 dBi, and a corresponding radiation efficiency at f0 is −6 dB; a resonant frequency f0 of the liquid crystal layer in a flat state is 3.36 GHz, a corresponding gain G at f0 is 0.66 dBi, and a corresponding radiation efficiency at f0 is −4.8 dB; and a resonance frequency f0 of the liquid crystal layer in a mixed state is 3.56 GHz, a corresponding gain G at f0 is 0.89 dBi, and a corresponding radiation efficiency at f0 is −5.5 dB. A frequency modulation range of the antenna unit of the sixth example is about 360 MHz, which may basically cover 5G n78 frequency band, and antenna performance may meet requirements of a mobile phone for an antenna. As in the first example, using glass with low dielectric loss does not significantly improve the performance of the antenna.

The antenna unit provided by this exemplary embodiment has advantages of simple structure, light and thin appearance, reconfigurable tuning frequency connection, wide tuning range, etc., which may be applied to a 5G terminal device.

An embodiment of the present disclosure further provides a preparation method of an antenna unit, which includes the following acts: preparing a first substrate and a second substrate; aligning and cell-assembling the first substrate and the second substrate to form a liquid crystal cell; preparing a third substrate; attaching the third substrate to the liquid crystal cell so that a feed structure layer is located on a side of a third base substrate away from the second substrate. The first substrate includes a first base substrate and a radiation unit layer. The second substrate includes a second base substrate and a ground layer. The radiation unit faces the ground layer. The third substrate includes the third base substrate and the feed structure layer.

In some exemplary embodiments, the preparation method of this embodiment further includes: after attaching the third substrate to the liquid crystal cell, pouring a liquid crystal material into a cavity of the liquid crystal cell to form a liquid crystal layer.

The preparation method of the antenna unit of this embodiment may be referred to the descriptions of the aforementioned embodiments, which will not be repeated here.

The antenna unit provided in this exemplary embodiment may be combined with a display preparation process and a flexible circuit board process to obtain different parts of the antenna unit, and then the antenna unit may be obtained by using a form of attaching, which may ensure uniformity of a thickness of the liquid crystal cell, thereby ensuring stability of antenna performance.

Figure 8:
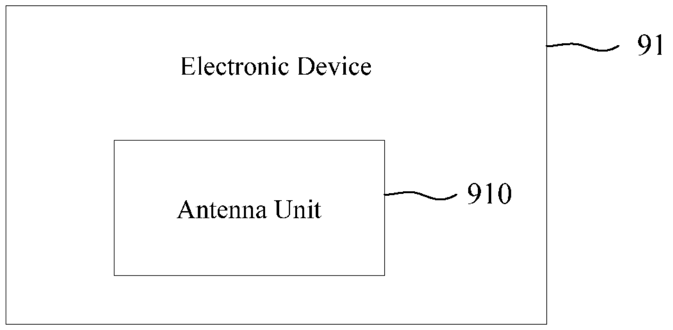
FIG. 8 is a schematic diagram of an electronic device according to at least one embodiment of the present disclosure.

FIG. 8 is a schematic diagram of an electronic device according to at least one embodiment of the present disclosure. As shown in FIG. 8, this embodiment provides an electronic device 91, which includes an antenna unit 910. The electronic device 91 may be any product or component with communication functions such as a smart phone, a navigation apparatus, a game console, a television (TV), a car audio, a tablet, a personal multimedia player (PMP), and a personal digital assistant (PDA). However, this is not limited in the embodiment.

The drawings in the present disclosure only refer to structures involved in the present disclosure, and other structures may refer to common designs. The embodiments and features in the embodiments of the present disclosure may be combined with each other to obtain a new embodiment if there is no conflict.

Those of ordinary skills in the art should understand that modifications or equivalent substitutions may be made to the technical solutions of the present disclosure without departing from the spirit and scope of the technical solutions of the present disclosure, all of which should be included within the scope of the claims of the present disclosure.

What is claimed is:

1. An antenna unit comprising:

a first substrate and a second substrate that are oppositely disposed, a liquid crystal layer located between the first substrate and the second substrate, and a third substrate located on a side of the second substrate away from the liquid crystal layer; wherein the first substrate comprises a first base substrate and a radiation unit layer, wherein the radiation unit layer faces the liquid crystal layer;

the second substrate comprises a second base substrate and a ground layer, wherein the ground layer faces the liquid crystal layer;

the third substrate comprises a third base substrate and a feed structure layer, wherein the feed structure layer is located on a side of the third base substrate away from the second substrate;

wherein the feed structure layer comprises a microstrip line extending along a second direction; in a first direction, a distance between a center line of the microstrip line and a center line of a slotted region of the ground layer is less than or equal to 3 mm; the first direction crosses the second direction.

2. The antenna unit according to claim 1, wherein the first base substrate and the second base substrate are rigid base substrates and the third base substrate is a flexible base substrate.

3. The antenna unit according to claim 2, wherein the first base substrate and the second base substrate are glass substrates.

4. The antenna unit according to claim 1, wherein the ground layer has a slotted region; an overlap region of orthographic projections of the radiation unit layer and the feed structure layer on the second base substrate is overlapped with an orthographic projection of the slotted region on the second base substrate.

5. The antenna unit according to claim 1, wherein the first substrate further comprises: a first conductive layer connected to the radiation unit layer, wherein the first conductive layer is located on a side of the radiation unit layer close to the first base substrate;

the second substrate further comprises a second conductive layer connected to the ground layer, wherein the second conductive layer is located on a side of the ground layer close to the second base substrate.

6. The antenna unit according to claim 5, wherein the first conductive layer comprises a first electrode; an orthographic projection of the second substrate on the first substrate is not overlapped with the first electrode;

the second conductive layer comprises a second electrode; an orthographic projection of the first substrate on the second substrate is not overlapped with the second electrode.

7. The antenna unit according to claim 5, wherein materials of the first conductive layer and the second conductive layer are indium tin oxide and materials of the radiation unit layer and the ground layer are metal materials.

8. The antenna unit according to claim 5, wherein thicknesses of the radiation unit layer and the ground layer are greater than thicknesses of the first conductive layer and the second conductive layer.

9. The antenna unit according to claim 1, wherein the ground layer comprises a first connection region, wherein an orthographic projection of the first substrate on the second substrate is not overlapped with the first connection region; an orthographic projection of the feed structure layer on the second substrate is overlapped with the first connection region.

10. An electronic device comprising an antenna unit, wherein the antenna unit comprises:

a first substrate and a second substrate that are oppositely disposed, a liquid crystal layer located between the first substrate and the second substrate, and a third substrate located on a side of the second substrate away from the liquid crystal layer;

the first substrate comprises a first base substrate and a radiation unit layer, wherein the radiation unit layer faces the liquid crystal layer;

the second substrate comprises a second base substrate and a ground layer, wherein the ground layer faces the liquid crystal layer;

the third substrate comprises a third base substrate and a feed structure layer, wherein the feed structure layer is located on a side of the third base substrate away from the second substrate;

wherein the feed structure layer comprises a microstrip line extending along a second direction; in a first direction, a distance between a center line of the microstrip line and a center line of a slotted region of the ground layer is less than or equal to 3 mm; the first direction crosses the second direction.

11. The electronic device according to claim 10, wherein the first base substrate and the second base substrate are rigid base substrates and the third base substrate is a flexible base substrate.

12. The electronic device according to claim 10, wherein the ground layer has a slotted region; an overlap region of orthographic projections of the radiation unit layer and the feed structure layer on the second base substrate is overlapped with an orthographic projection of the slotted region on the second base substrate.

13. The electronic device according to claim 10, wherein, the first substrate further comprises a first conductive layer connected to the radiation unit layer, wherein the first conductive layer is located on a side of the radiation unit layer close to the first base substrate;

the second substrate further comprises a second conductive layer connected to the ground layer, wherein the second conductive layer is located on a side of the ground layer close to the second base substrate.

14. The electronic device according to claim 13, wherein the first conductive layer comprises a first electrode; an orthographic projection of the second substrate on the first substrate is not overlapped with the first electrode;

the second conductive layer comprises a second electrode; an orthographic projection of the first substrate on the second substrate is not overlapped with the second electrode.

15. The electronic device according to claim 13, wherein thicknesses of the radiation unit layer and the ground layer are greater than thicknesses of the first conductive layer and the second conductive layer.

16. The electronic device according to claim 10, wherein the ground layer comprises a first connection region, and the orthographic projection of the first substrate on the second substrate is not overlapped with the first connection region; and an orthographic projection of the feed structure layer on the second substrate is overlapped with the first connection region.

17. A preparation method of an antenna unit, comprising:

preparing a first substrate and a second substrate that are oppositely disposed, wherein the first substrate comprises a first base substrate and a radiation unit layer; the second substrate comprises: a second base substrate and a ground layer;

aligning and cell-assembling the first substrate and the second substrate to form a liquid crystal cell located between the first substrate and the second substrate; the radiation unit layer faces the liquid crystal layer; the ground layer faces the liquid crystal layer;

preparing a third substrate located on a side of the second substrate away from the liquid crystal layer, wherein the third substrate comprises a third base substrate and a feed structure layer;

attaching the third substrate to the liquid crystal cell, wherein the feed structure layer is located on a side of the third base substrate away from the second substrate;

wherein the feed structure layer comprises a microstrip line extending along a second direction; in a first direction, a distance between a center line of the microstrip line and a center line of a slotted region of the ground layer is less than or equal to 3 mm; the first direction crosses the second direction.

18. The preparation method according to claim 17, further comprising: after attaching the third substrate to the liquid crystal cell, pouring a liquid crystal material into a cavity of the liquid crystal cell to form a liquid crystal layer.

* * * * *